(12) United States Patent
Aghasaryan et al.

(10) Patent No.: US 12,476,880 B2
(45) Date of Patent: Nov. 18, 2025

(54) METHOD AND APPARATUS FOR PREDICTIVE MAINTENANCE

(71) Applicant: Nokia Solutions and Networks Oy, Espoo (FI)

(72) Inventors: Armen Aghasaryan, Massy (FR); Kerim Palamutcuogullari, Reading (GB); Rajesh Banerjee, Dallas, TX (US); Dimitre Davidov Kostadinov, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/408,709

(22) Filed: Jan. 10, 2024

(65) Prior Publication Data

US 2024/0250882 A1 Jul. 25, 2024

(30) Foreign Application Priority Data

Jan. 20, 2023 (FI) .................................... 20235061

(51) Int. Cl.
*G06F 15/173* (2006.01)
*H04L 41/147* (2022.01)
*H04L 41/16* (2022.01)

(52) U.S. Cl.
CPC ............ *H04L 41/147* (2013.01); *H04L 41/16* (2013.01)

(58) Field of Classification Search
CPC ... H04L 41/12; H04L 41/5009; H04L 41/149; H04L 43/08; H04L 41/0631
See application file for complete search history.

(56) References Cited

U.S. PATENT DOCUMENTS

| 8,166,352 B2 | 4/2012 | Harnois |
| 10,716,017 B2 | 7/2020 | Lyon et al. |

(Continued)

FOREIGN PATENT DOCUMENTS

| EP | 4068693 A1 | 10/2022 |
| FR | 2802663 B1 | 1/2002 |

(Continued)

OTHER PUBLICATIONS

Extended European Search Report received for corresponding European Patent Application No. 24151543.6, dated Jun. 7, 2024, 10 pages.

(Continued)

*Primary Examiner* — Padma Mundur
(74) *Attorney, Agent, or Firm* — Duft & Bornsen, PC

(57) ABSTRACT

An apparatus for predictive maintenance, the apparatus comprising means for:

Collecting a primary data bundle, wherein the primary data bundle comprises a first set of measurement time-series, wherein the first set of measurement time-series represents first alarms relating to a physical module of a telecommunications network, Processing maintenance data to determine whether the primary data bundle is associated with a maintenance intervention on the physical module, In response to determining that the primary data bundle is associated with a maintenance intervention, collecting a secondary data bundle, wherein the secondary data bundle comprises a second set of measurement time-series, wherein the second set of measurement time-series represents second alarms relating to the physical module, (Continued)

Training a predictive model using the primary data bundle and the secondary data bundle, wherein the predictive model is configured to compute an anomaly-related prediction.

20 Claims, 4 Drawing Sheets

(56) References Cited

U.S. PATENT DOCUMENTS

| | | |
|---|---|---|
| 11,175,973 B1 | 11/2021 | Kordjazi et al. |
| 2019/0303726 A1 | 10/2019 | Cote et al. |
| 2019/0327130 A1* | 10/2019 | Huang ................ H04L 41/0631 |
| 2022/0166682 A1 | 5/2022 | Patrick et al. |
| 2024/0160511 A1* | 5/2024 | Hao .................... G06F 11/0751 |
| 2025/0007787 A1* | 1/2025 | Burgarella .......... H04L 41/0631 |

FOREIGN PATENT DOCUMENTS

| | | |
|---|---|---|
| WO | 2021/101490 A1 | 5/2021 |
| WO | 2021/118526 A1 | 6/2021 |
| WO | 2022/002357 A1 | 1/2022 |

OTHER PUBLICATIONS

"tf-idf", Wikipedia, Retrieved on Jan. 16, 2024, Webpage available at : https://en.wikipedia.org/wiki/Tf%E2%80%93idf.

Office action received for corresponding Finnish Patent Application No. 20235061, dated May 10, 2023, 12 pages.

Office action received for corresponding Finnish Patent Application No. 20235061, dated Nov. 1, 2023, 5 pages.

\* cited by examiner

METHOD AND APPARATUS FOR PREDICTIVE MAINTENANCE

FIELD

The disclosure relates to apparatuses and methods for predictive maintenance in a telecommunications network.

BACKGROUND

Predictive maintenance allows to predict a fault in a system before it happens and to anticipate a maintenance intervention. In a telecommunications network, failures may lead to network downtime and unnecessary costs. Thus, predictive maintenance allows to replace modules before a failure happens.

In a telecommunications network, there is a need to identify to which modules the alarms correspond and determine which alarms may ultimately result in faults.

Thus, there is a need for apparatuses and methods which may automatically analyze data from the telecommunications network and predict accurately future faults in the telecommunications network.

SUMMARY

In some embodiments, the disclosure provides an apparatus for predictive maintenance of modules in a telecommunications network. The apparatus comprises means for:
  Collecting a primary data bundle, wherein the primary data bundle comprises a first set of measurement time-series, wherein the first set of measurement time-series is generated by a telecommunications network during a first time-window, wherein the measurement time-series of the first set relate to a physical module of the telecommunications network,
  Processing maintenance data relating to maintenance of the physical module or to maintenance of a network element comprising the physical module, to determine whether the primary data bundle is associated with a fault-related maintenance intervention on the physical module carried out after the first time-window,
  In response to determining that the primary data bundle is associated with a maintenance intervention on the physical module after the first time-window, accessing a secondary data bundle, wherein the secondary data bundle comprises a second set of measurement time-series, wherein the second set of measurement time-series is generated by the telecommunications network during a second time-window, wherein the second time-window started before the first time-window, wherein the measurement time-series of the second set relate to the physical module of the telecommunications network,
  Training a predictive model using the primary data bundle and the secondary data bundle, wherein the predictive model is configured to compute an anomaly-related prediction relating to the telecommunications network.

Thanks to these features, the predictive model learns to detect a fault in the physical module before the fault happen.

The apparatus for predictive maintenance may also comprise one or more of the following features.

In an embodiment, the first set of measurement time-series is generated by first network elements of the telecommunications network and the primary data bundle comprises unique identifiers identifying the first network elements and identifying the physical module. In this embodiment, the apparatus further comprises means for generating a summarized primary data bundle from the primary data bundle, wherein the summarized primary data bundle does not comprise the unique identifiers, and the predictive model is trained using the summarized primary data bundle.

Thanks to these features, the predictive model learns from more generalized data, which enables a better performance of the predictive model.

In an embodiment, the apparatus further comprises means for collecting network element metadata relating to the first network elements, wherein the network element metadata comprises a network element type, wherein the predictive model is trained using the network element metadata.

Thanks to these features, the predictive model may learn to associate values of a measurement time-series with a fault or with a normal behaviour, based on the network element type.

In an embodiment, the first set of measurement time-series represents first alarms and the apparatus further comprises means for collecting alarm metadata relating to the first alarms, wherein the alarm metadata comprises an alarm type, wherein the predictive model is trained using the alarm metadata.

Thanks to these features, the predictive model learns to differentiate between a plurality of alarms.

In an embodiment, the maintenance data comprises records of on-field replacement of the physical module in the telecommunications network and the means for processing the maintenance data further comprise determining whether the primary data bundle is associated with an on-field replacement of the physical module, and wherein collecting the secondary data bundle is done in response to determining that the primary data bundle is associated with an on-field replacement of the physical module.

Thanks to these features, ground-truth labels associated to the primary data bundle are obtained by monitoring actual replacements of the physical modules.

In an embodiment, the maintenance data comprises records of anomalies of the physical module and processing the maintenance data comprises determining whether the primary data bundle is associated with an anomaly of the physical module. In this embodiment, collecting the secondary data bundle is done in response to determining that the primary data bundle is associated with an anomaly of the physical module.

Thanks to these features, positive anomaly labels are associated with physical modules which were replaced after a fault.

In an embodiment, the apparatus further comprises means for:
  Training a plurality of predictive models using the primary data bundle and the secondary data bundle, wherein each of the plurality of predictive models is configured to compute an intermediate anomaly-related prediction, wherein the anomaly-related prediction relates to a probability of anomalous behavior during a respective elementary time-period,
  Combining the intermediate anomaly-related predictions into a final anomaly-related prediction, wherein the final anomaly-related prediction relates to a probability of anomalous behavior during a final time-period, wherein the final time-period is a reunion of the elementary time-periods.

Thanks to these features, an accuracy of prediction may be increased by using a set of models.

In an embodiment, the apparatus further comprises means for:

Retrieving a measurement time-series generated by a network element, wherein the measurement time-series represents an alarm on the telecommunications network, Determining that the physical module belongs to the network element using topology data, wherein the topology data encodes a configuration of the telecommunications network, Adding the measurement time-series to the first data bundle in response to determining that the physical module belongs to the network element.

Thanks to these features, a measurement time-series is associated to the relevant physical module.

In an embodiment, the apparatus further comprises means for:

Retrieving a measurement time-series generated by a network element, wherein the measurement time-series represents an alarm on the telecommunications network, Comparing an identifier of the network element with an identifier of the physical module to determine that the identifier of the network element and the identifier of the physical module fulfil a similarity condition using a semantic similarity metric, Adding the measurement time-series to the first data bundle in response to determining that the identifier of the network element and the identifier of the physical module fulfil the similarity condition.

Thanks to these features, a measurement time-series is associated to the relevant physical module.

In some example embodiments, the disclosure also provides a method for predictive maintenance, the method comprising the steps of:

Collecting a primary data bundle, wherein the primary data bundle comprises a first set of measurement time-series, wherein the first set of measurement time-series is generated by a telecommunications network during a first time-window, wherein the measurement time-series of the first set relate to a physical module of the telecommunications network, Processing maintenance data relating to maintenance of the physical module or to maintenance of a network element comprising the physical module, to determine whether the primary data bundle is associated with a fault-related maintenance intervention on the physical module carried out after the first time-window, In response to determining that the primary data bundle is associated with a maintenance intervention on the physical module after the first time-window, accessing a secondary data bundle, wherein the secondary data bundle comprises a second set of measurement time-series, wherein the second set of measurement time-series is generated by the telecommunications network during a second time-window, wherein the second time-window started before the first time-window, wherein the measurement time-series of the second set relate to the physical module of the telecommunications network, Training a predictive model using the primary data bundle and the secondary data bundle, wherein the predictive model is configured to compute an anomaly-related prediction relating to the telecommunications network.

The method for predictive maintenance may also comprise one or more of the following features.

In an embodiment, the first set of measurement time-series is generated by first network elements of the telecommunications network and the primary data bundle comprises unique identifiers identifying the first network elements and identifying the physical module. In this embodiment, the method further comprises the steps of generating a summarized primary data bundle from the primary data bundle, wherein the summarized primary data bundle does not comprise the unique identifiers, and the predictive model is trained using the summarized primary data bundle.

In an embodiment, the method further comprises the steps of collecting network element metadata relating to the first network elements, wherein the network element metadata comprises a network element type, wherein the predictive model is trained using the network element metadata.

In an embodiment, the first set of measurement time-series represents first alarms and the method further comprises the steps of collecting alarm metadata relating to the first alarms, wherein the alarm metadata comprises an alarm type, wherein the predictive model is trained using the alarm metadata.

In an embodiment, the maintenance data comprises records of on-field replacement of the physical module in the telecommunications network and the steps of processing the maintenance data further comprise determining whether the primary data bundle is associated with an on-field replacement of the physical module, and wherein collecting the secondary data bundle is done in response to determining that the primary data bundle is associated with an on-field replacement of the physical module.

In an embodiment, the maintenance data comprises records of anomalies of the physical module and processing the maintenance data comprises determining whether the primary data bundle is associated with an anomaly of the physical module. In this embodiment, collecting the secondary data bundle is done in response to determining that the primary data bundle is associated with an anomaly of the physical module.

In an embodiment, the method further comprises the steps of:

Training a plurality of predictive models using the primary data bundle and the secondary data bundle, wherein each of the plurality of predictive models is configured to compute an intermediate anomaly-related prediction, wherein the anomaly-related prediction relates to a probability of anomalous behavior during a respective elementary time-period, Combining the intermediate anomaly-related predictions into a final anomaly-related prediction, wherein the final anomaly-related prediction relates to a probability of anomalous behavior during a final time-period, wherein the final time-period is a reunion of the elementary time-periods.

In an embodiment, the method further comprises the steps of:

Retrieving a measurement time-series generated by a network element, wherein the measurement time-series represents an alarm on the telecommunications network, Determining that the physical module belongs to the network element using topology data, wherein the topology data encodes a configuration of the telecommunications network, Adding the measurement time-series to the first data bundle in response to determining that the physical module belongs to the network element.

In an embodiment, the method further comprises the steps of:

Retrieving a measurement time-series generated by a network element, wherein the measurement time-series represents an alarm on the telecommunications network, Comparing an identifier of the network element with an identifier of the physical module to determine that the identifier of the network element and the identifier of the physical module fulfil a similarity condition using a semantic similarity metric, Adding the measurement time-series to the first data bundle in response to determining that the identifier of the network element and the identifier of the physical module fulfil the similarity condition.

In some embodiments, the invention provides a non-transitory computer readable medium comprising program instructions for causing an apparatus to perform the above method.

In some example embodiments, the means in the apparatus further comprises:

At least one processor; and

At least one memory including a computer program code, the at least one memory and computer program code configured to, with the at least one processor, cause the operations of the apparatus.

The at least one memory and the computer program code may be configured to, with the at least one processor, cause the apparatus to:

Collect a primary data bundle, wherein the primary data bundle comprises a first set of measurement time-series, wherein the first set of measurement time-series is generated by a telecommunications network during a first time-window, wherein the measurement time-series of the first set relate to a physical module of the telecommunications network, Process maintenance data relating to maintenance of the physical module or to maintenance of a network element comprising the physical module, to determine whether the primary data bundle is associated with a fault-related maintenance intervention on the physical module carried out after the first time-window, In response to determining that the primary data bundle is associated with a maintenance intervention on the physical module after the first time-window, access a secondary data bundle, wherein the secondary data bundle comprises a second set of measurement time-series, wherein the second set of measurement time-series is generated by the telecommunications network during a second time-window, wherein the second time-window started before the first time-window, wherein the measurement time-series of the second set relate to the physical module of the telecommunications network, Train a predictive model using the primary data bundle and the secondary data bundle, wherein the predictive model is configured to compute an anomaly-related prediction relating to the telecommunications network.

In an embodiment, the first set of measurement time-series is generated by first network elements of the telecommunications network and the primary data bundle comprises unique identifiers identifying the first network elements and identifying the physical module. In this embodiment, the at least one memory and the computer program code may further be configured to, with the at least one processor, cause the apparatus to generate a summarized primary data bundle from the primary data bundle, wherein the summarized primary data bundle does not comprise the unique identifiers, and the predictive model is trained using the summarized primary data bundle.

In an embodiment, the at least one memory and the computer program code may further be configured to, with the at least one processor, cause the apparatus to collect network element metadata relating to the first network elements, wherein the network element metadata comprises a network element type, wherein the predictive model is trained using the network element metadata.

In an embodiment, the first set of measurement time-series represents first alarms and the at least one memory and the computer program code may further be configured to, with the at least one processor, cause the apparatus to collect alarm metadata relating to the first alarms, wherein the alarm metadata comprises an alarm type, wherein the predictive model is trained using the alarm metadata.

In an embodiment, the maintenance data comprises records of on-field replacement of the physical module in the telecommunications network and the processing the maintenance data further comprises determining whether the primary data bundle is associated with an on-field replacement of the physical module, and wherein collecting the secondary data bundle is done in response to determining that the primary data bundle is associated with an on-field replacement of the physical module.

In an embodiment, the maintenance data comprises records of anomalies of the physical module and processing the maintenance data comprises determining whether the primary data bundle is associated with an anomaly of the physical module. In this embodiment, collecting the secondary data bundle is done in response to determining that the primary data bundle is associated with an anomaly of the physical module.

In an embodiment, the at least one memory and the computer program code may further be configured to, with the at least one processor, cause the apparatus to:

Train a plurality of predictive models using the primary data bundle and the secondary data bundle, wherein each of the plurality of predictive models is configured to compute an intermediate anomaly-related prediction, wherein the anomaly-related prediction relates to a probability of anomalous behavior during a respective elementary time-period, Combine the intermediate anomaly-related predictions into a final anomaly-related prediction, wherein the final anomaly-related prediction relates to a probability of anomalous behavior during a final time-period, wherein the final time-period is a reunion of the elementary time-periods.

In an embodiment, the at least one memory and the computer program code may further be configured to, with the at least one processor, cause the apparatus to:

Retrieve a measurement time-series generated by a network element, wherein the measurement time-series represents an alarm on the telecommunications network, Determine that the physical module belongs to the network element using topology data, wherein the topology data encodes a configuration of the telecommunications network, Add the measurement time-series to the first data bundle in response to determining that the physical module belongs to the network element.

In an embodiment, the at least one memory and the computer program code may further be configured to, with the at least one processor, cause the apparatus to:

Retrieve a measurement time-series generated by a network element, wherein the measurement time-series represents an alarm on the telecommunications network, Compare an identifier of the network element with an identifier of the physical module to determine that the identifier of the network element and the identifier of the physical module fulfil a similarity condition using a semantic similarity metric, Add the measurement time-series to the first data bundle in response to determining that the identifier of the network element and the identifier of the physical module fulfil the similarity condition.

In some example embodiments, the disclosure also provides an apparatus comprising:

A first collecting circuitry configured to collect a primary data bundle, wherein the primary data bundle comprises a first set of measurement time-series, wherein the first set of measurement time-series is generated by a telecommunications network during a first time-window, wherein the measurement time-series of the first set relate to a physical module of the telecommunications network, A first processing circuitry configured to process maintenance data relating to maintenance of the physical module or to maintenance of a network element comprising the physical module, to determine whether the primary data bundle is associated with a fault-related maintenance intervention on the physical module carried out after the first time-window, A first accessing circuitry configured, in response to determining that the primary data bundle is associated with a maintenance intervention on the physical module after the first time-window, to access a secondary data bundle, wherein the secondary data bundle comprises a second set of measurement time-series, wherein the second set of measurement time-series is generated by the telecommunications network during a second time-window, wherein the second time-window started before the first time-window, wherein the measurement time-series of the second set relate to the physical module of the telecommunications network, A first training circuitry configured to train a predictive model using the primary data bundle and the secondary data bundle, wherein the predictive model is configured to compute an anomaly-related prediction relating to the telecommunications network.

In an embodiment, the first set of measurement time-series is generated by first network elements of the telecommunications network and the primary data bundle comprises unique identifiers identifying the first network elements and identifying the physical module. In this embodiment, the apparatus further comprises a first generating circuitry configured to generate a summarized primary data bundle from the primary data bundle, wherein the summarized primary data bundle does not comprise the unique identifiers, and the predictive model is trained using the summarized primary data bundle.

In an embodiment, the apparatus further comprises a second collecting circuitry configured to collect network element metadata relating to the first network elements, wherein the network element metadata comprises a network element type, wherein the predictive model is trained using the network element metadata.

In an embodiment, the first set of measurement time-series represents first alarms and the apparatus further comprises a third collecting circuitry configured to collect alarm metadata relating to the first alarms, wherein the alarm metadata comprises an alarm type, wherein the predictive model is trained using the alarm metadata.

In an embodiment, the maintenance data comprises records of on-field replacement of the physical module in the telecommunications network and the first processing circuitry is further configured to determine whether the primary data bundle is associated with an on-field replacement of the physical module, and wherein collecting the secondary data bundle is done in response to determining that the primary data bundle is associated with an on-field replacement of the physical module.

In an embodiment, the maintenance data comprises records of anomalies of the physical module and processing the maintenance data comprises determining whether the primary data bundle is associated with an anomaly of the physical module. In this embodiment, collecting the secondary data bundle is done in response to determining that the primary data bundle is associated with an anomaly of the physical module.

In an embodiment, the apparatus further comprises:

A second training circuitry configured to train a plurality of predictive models using the primary data bundle and the secondary data bundle, wherein each of the plurality of predictive models is configured to compute an intermediate anomaly-related prediction, wherein the anomaly-related prediction relates to a probability of anomalous behavior during a respective elementary time-period, A first combining circuitry configured to combine the intermediate anomaly-related predictions into a final anomaly-related prediction, wherein the final anomaly-related prediction relates to a probability of anomalous behavior during a final time-period, wherein the final time-period is a reunion of the elementary time-periods.

In an embodiment, the apparatus further comprises:

A first retrieving circuitry configured to retrieve a measurement time-series generated by a network element, wherein the measurement time-series represents an alarm on the telecommunications network, A first determining circuitry configured to determine that the physical module belongs to the network element using topology data, wherein the topology data encodes a configuration of the telecommunications network, A first adding circuitry configured to add the measurement time-series to the first data bundle in response to determining that the physical module belongs to the network element.

In an embodiment, the apparatus further comprises:

A second retrieving circuitry configured to retrieve a measurement time-series generated by a network element, wherein the measurement time-series represents an alarm on the telecommunications network, A comparing circuitry configured to compare an identifier of the network element with an identifier of the physical module to determine that the identifier of the network element and the identifier of the physical module fulfil a similarity condition using a semantic similarity metric, A second adding circuitry configured to add the measurement time-series to the first data bundle in response to determining that the identifier of the network element and the identifier of the physical module fulfil the similarity condition.

BRIEF DESCRIPTION OF THE DRAWINGS

These and other aspects of the invention will be apparent from and elucidated with reference to example embodiments described hereinafter, by way of example, with reference to the drawings.

DETAILED DESCRIPTION OF THE EMBODIMENTS

Figure 1:
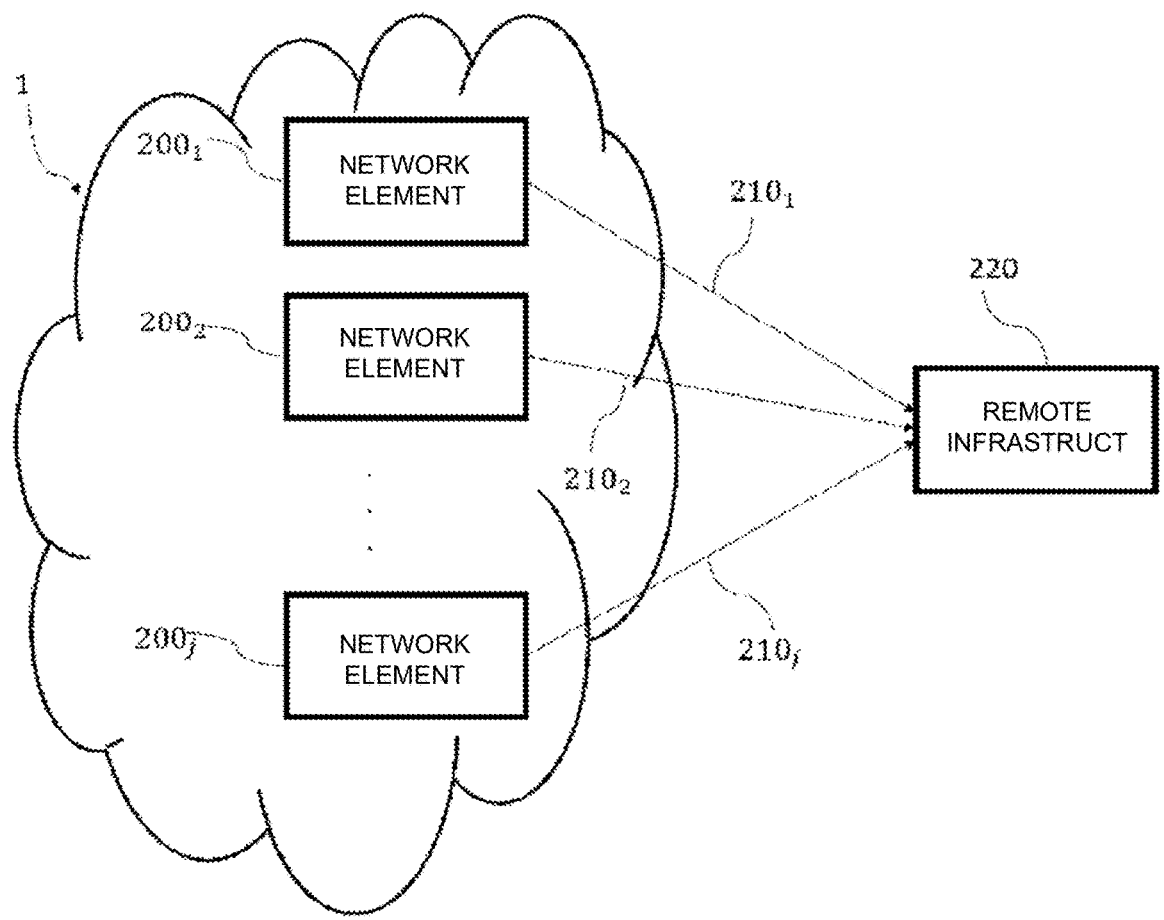
FIG. 1 represents a schematic view of network elements in communication with a remote infrastructure.

FIG. 1 represents a plurality of network elements $200_1, 200_2, \ldots, 200_j$ in a telecommunications network 1. The network elements $200_1, 200_2, \ldots, 200_j$ are in communication with a remote infrastructure 220, the remote infrastructure 220 receiving data streams $210_1, 210_2, \ldots, 210_j$ from the network elements $200_1, 200_2, \ldots, 200_j$. Remote infrastructure 220 may be a network management apparatus.

Telecommunications network 1 may be any type of network, e.g. fixed or mobile. The network elements 200_1, 200_2, ..., 200_j are connected by communication links not shown, e.g. optical links, radio links, wired inks, etc. In a cellular network, the network elements 200_1, 200_2, ..., 200_j may comprise cellular network equipment such as Base Station Controllers, Base Station Control Functions, Base Transceiver Stations, and Transceivers. The network elements 200_1, 200_2, ..., 200_j may comprise physical or logical entities, on hardware or software.

The remote infrastructure 220 may be on premise or may be deployed in a cloud. The remote infrastructure 220 may receive telemetry data streams from the network elements. The data streams $210_1, 210_2, \ldots, 210_j$ may be near real-time or batches.

The data streams $210_1, 210_2, \ldots, 210_j$ may be collected and used for inference in near-real time or may be stored for future training of a data-processing model.

The remote infrastructure 220 may be a maintenance unit. The data streams $210_1, 210_2, \ldots, 210_j$ may comprise alarm signals generated by the network elements $200_1, 200_2, \ldots, 200_j$. The alarm signals may comprise frequency counters relating to a relevant network parameter and/or start and ending time of relevant events. The alarm signals may not necessarily relate to a failure in the network elements. For example, some alarm signals may be generated in both normal and abnormal situations and may not be characteristic of a fault.

A number of network elements monitored by the remote infrastructure 220 may range up to hundreds of thousands. The remote infrastructure may have access to network elements metadata associated with the network elements $200_1, 200_2, \ldots, 200_j$. The network elements metadata may comprise attributes relating to the physical features of the network elements $200_1, 200_2, \ldots, 200_j$ and an environment of said network elements $200_1, 200_2, \ldots, 200_j$.

Figure 2:
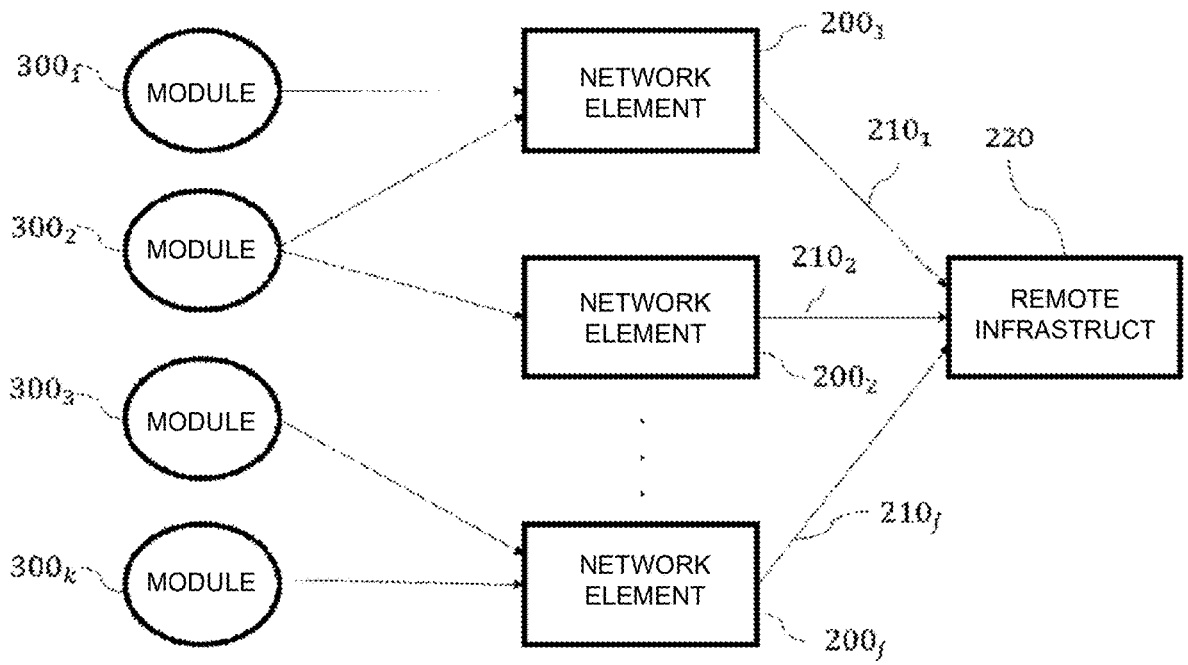
FIG. 2 represents a schematic view of replaceable modules connected to the network elements of FIG. 1.

With reference to FIG. 2, replaceable modules $300_1, 300_2, \ldots, 300_k$ may be connected to the network elements $200_1, 200_2, \ldots, 200_j$.

The replaceable modules $300_1, 300_2, \ldots, 300_k$ are physical entities made of hardware components comprised in network elements $200_1, 200_2, \ldots, 200_j$ or in relation with network elements $200_1, 200_2, \ldots, 200_j$. The replaceable modules $300_1, 300_2, \ldots, 300_k$ may be subject to maintenance operations such as removal, repairs and replacement.

Examples of replaceable modules $300_1, 300_2, \ldots, 300_k$ may include system modules, baseband modules and radio modules of a base transceiver station.

The replaceable modules $300_1, 300_2, \ldots, 300_k$ may also comprise sub-elements of a network element. For example, the replaceable module $300_1, 300_2, \ldots, 300_k$ may be a radio module in a base station and the network element may be the base station.

A network element may be connected to several of the replaceable modules $300_1, 300_2, \ldots, 300_k$ at the same time. A replaceable module may be a cable connected to two of the replaceable modules $300_1, 300_2, \ldots, 300_k$.

The network elements $200_1, 200_2, \ldots, 200_j$ transmit data streams $210_1, 210_2, \ldots, 210_j$ to the remote infrastructure 220, the data streams $210_1, 210_2, \ldots, 210_j$ comprising alarm signals. The alarm signals may relate indirectly to the replaceable modules $300_1, 300_2, \ldots, 300_k$, although they are generated by the network elements $200_1, 200_2, \ldots, 200_j$. The alarm signals may comprise incorrect and/or unusual values of a parameter which signals a warning, a malfunction or a failure of the replaceable modules $300_1, 300_2, \ldots, 300_k$. Thus, mapping the alarm signals to the replaceable modules $300_1, 300_2, \ldots, 300_k$ is a non-trivial task crucial to performing effective predictive maintenance.

Figure 3:
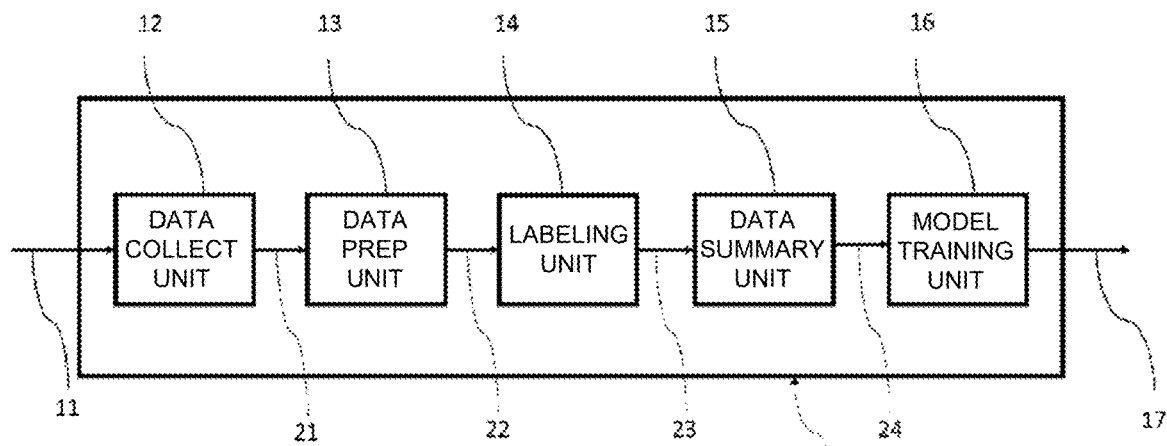
FIG. 3 represents a schematic view of a predictive-maintenance apparatus embedded in the remote infrastructure according to an embodiment.

With reference to FIG. 3, a predictive-maintenance apparatus 10 is depicted. The predictive-maintenance apparatus 10 may be embedded in the remote infrastructure 220.

A goal of the predictive-maintenance apparatus 10 is to learn to detect upcoming failures of replaceable modules by processing network data 11. A failure of a replaceable module may cause significant damage in the exploitation of the telecommunications network, by causing network malfunction or network downtime. Thus, predictive maintenance mitigates an impact of failures by pre-emptively replacing and/or repairing a replaceable module before a failure happens.

The network data 11 comprises the alarm signals generated by the network elements. The predictive-maintenance apparatus 10 may also have access to network elements metadata. The network elements metadata may comprise attributes relating to the physical features of the network elements, identifiers of the network elements and an environment of said network elements, such as a local topology of the telecommunications network.

The predictive-maintenance apparatus 10 comprises a data-collection unit 12, a data-preparation unit 13, an auto-labelling unit 14, a data-summarization unit 15 and a training unit 16. The network data 11 is transformed by the predictive-maintenance apparatus 10 and fed into a prediction model 17 for training. The predictive-maintenance apparatus 10 outputs the prediction model 17 after training.

The trained model 17 may then be used either in the predictive-maintenance apparatus or may be embedded in an inference unit. The inference unit may be part of the remote infrastructure 220 but may also be exploited in a different setting.

The data collection unit 12 receives the network data 11 either directly from the network elements or from distributed local collecting agents. The distributed local collecting agents are deployed in the telecommunications network, on premise with the network elements. The distributed local collecting agents filter relevant events in the network elements and transmit the network data 11 to the data-collection unit 12.

According to an embodiment, the network data 11 comprises event dates and frequency counters.

The network data 11, once received, may be stored in the remote infrastructure 220, in a database or in a data warehouse. The data-collection unit 12 may store the network data 11 directly or point to a storage of the network data 11.

The data-collection unit 12 outputs collected data 21 and transmits the collected data 21 to the data preparation unit 13, either automatically or upon query from the data preparation unit 13.

The data preparation unit 13 formats the collected data 21, identifies to which replaceable modules the collected data 21 relates and creates identifiers relating to the collected data 21.

According to an embodiment, the collected data 21 is transformed into a plurality of time series by the data preparation unit 13. Each of the plurality of time series comprises an alarm signal or an evolution of a parameter for a given network element over a continuous time period. The collected data 21 may comprise time-series with different start times and ending times.

The data preparation unit 13 also groups the collected data 21 into unlabeled data bundles 22. An unlabeled data bundle comprises time-series generated by a plurality of network elements but relating to the same replaceable module, over the same time period.

The unlabeled data bundles 22 are then given as input to the auto-labelling unit 14.

The auto-labelling unit 14 receives the unlabeled data bundles 22 and associates an anomaly label to each of the unlabeled data bundles 22.

A positive anomaly label encodes a presence of an anomalous behavior in a data bundle. A negative anomaly label encodes an absence of an anomalous behavior in the data bundle. The word "positive" (respectively "negative") does not imply that the anomaly label is encoded by a positive (respectively negative) number.

The auto-labelling unit 14 also receives or has access to maintenance data. The maintenance data is used to determine the anomaly label associated with an unlabeled data bundle. The auto-labelling unit 14 outputs labeled data bundles 23.

The data summarization unit 15 performs a generalization step by removing identifiers of specific network elements from the labeled data bundles 23. Tags may be added to the labeled data bundles to establish a categorization of the labeled data bundles. The data summarization unit 15 enables a better performance of the prediction model by generalizing the labeled data bundles 23.

The data summarization unit 15 outputs summarized data bundles 24, which are then transmitted to the training unit 16.

The training unit 16 comprises the prediction model 17. According to an embodiment, the prediction model 17 comprises a regression model. Examples of suitable prediction models include Decision Trees, Random Forests, Support Vector Machines, Deep Neural Networks and Graph Neural Networks.

According to an embodiment, the prediction model 17 comprises survivability models or graph matching techniques.

The training unit 16 uses the labeled data bundles 23 to train the prediction model 17. The training unit 16 trains the prediction model 17 until an ending criterion is reached. The ending criterion may be a value of a cost function, a derivative of the cost function or a number of iterations.

The prediction model is structured to compute an anomaly-related prediction. The anomaly-related prediction quantifies a risk of failure for a time horizon. According to an embodiment, the anomaly-related prediction may be a confidence score or a probability of a failure happening during the time horizon.

The prediction model 17 may be able to compute the anomaly-related prediction for various intermediate time horizons inferior to the maximum time horizon. According to an embodiment, the maximum time horizon may be 2, 7 or 14 days. The maximum time horizon may also be chosen to be longer.

The anomaly-related prediction may comprise a statistic of failure events. The anomaly-related prediction may comprise an average time until the failure event or a median time until the failure event.

The training unit 16 outputs the prediction model 17 at the end of the training. The prediction model 17 may then be used for inference, on new network data.

Figure 4:
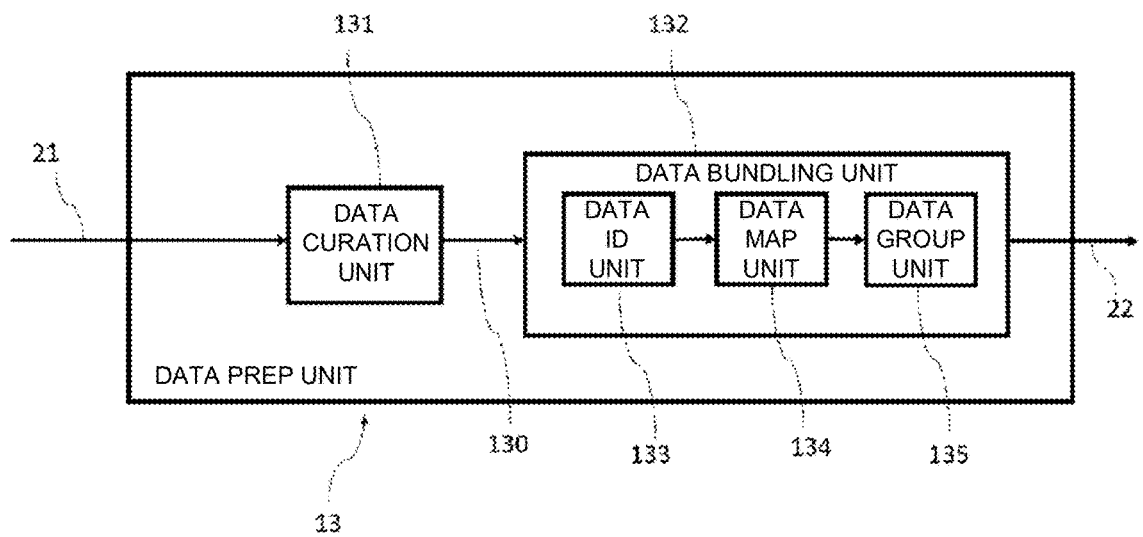
FIG. 4 represents a schematic view of a data-preparation unit within the predictive-maintenance apparatus.

With reference to FIG. 4, the data preparation unit 13 is described in further details.

The data preparation unit 13 comprises a data curation unit 131 and a data bundling unit 132.

The data curation unit 131 receives the collected data 21 and outputs curated time series 130.

The data curation unit 131 performs data cleaning and formatting, and preprocessing operations, such as computation of derived parameters. According to an embodiment, the data curation unit 131 transforms the collected data 21 into time-series.

For parameters of a given network element, the data curation unit selects periods of time where no data is missing to build time-series. The data curation unit may also, if possible, infer missing values by computing estimates and add said estimates to the collected data 21. The data curation unit 131 also identifies and removes corrupted data from the collected data 21.

The data curation unit 131 monitors a quality of the collected data 21. The data curation unit 131 computes metrics of data quality over the collected data 21. The data curation unit 131 sends instructions for retroactive corrective actions to the data collecting unit 12 and to the distributed local collecting agents to improve a quality of the network data 11.

The curated time series 130 computed by the data curation unit 131 are then retrieved by the data bundling unit 132. The data bundling unit 132 comprises a data identification unit 133, a data mapping unit 134 and a data grouping unit 135.

The data identification unit 133 associates time series identifiers to each of the curated time series 130. The time series identifiers may comprise a network element identifier, an alarm category variable and/or a network element category variable. The time series identifiers are unique to each of the curated time series 130.

The network element identifier encodes the identity of the network element which generated the alarm signal represented in the curated time series. For example, the network identifier may refer to a Base Station, a logical functional entity or a hardware module in the Base Station.

The alarm category variable encodes a category of alarm signal represented in the curated time series. The alarm category variable relates to a generic event type and may be determined using metadata or by analyzing patterns in the curated time series 130. The alarm category variable may be one of a fixed set of predetermined categories or a set of keywords.

The network element category variable encodes the type of network element and metadata about the network element. For example, the network element category variable may encode that the network element is a Base Station, a Transceiver, etc.

The data mapping unit 134 identifies the replaceable module each of the curated time-series 130 relates to. Indeed, the curated time series 130 are associated with the network elements which generated them. However, the curated time-series 130 indirectly refer to a possible failure of a replaceable module distinct from the network elements. Thus, there is a need to associate the curated time-series 130 with a replaceable module.

In particular, the replaceable module may be a component included in or directly connected to the network elements.

The data-mapping unit 134 may have access to network metadata files comprising local topology files or module composition files depicting how resources and modules are related to each other. The data-mapping unit 134 may analyze said local topology files or module composition files to determine an identity of the replaceable module associated to one of the curated time-series 130.

According to an embodiment, the data-mapping unit 134 associates one of the curated time series 130 to a replaceable module by performing prefix-based search. The data-mapping unit compares an identifier of the network element which generated the one of the curated time series with identifiers of replaceable modules in the network metadata files and picks the replaceable module with the longest common prefix.

According to an embodiment, the data-mapping unit 134 associates a curated time series to a replaceable module by performing connectivity-based search. Replaceable modules directly connected to the network element which generated the curated time series may be identified using the network topology files and associated with the curated time-series.

The curated time-series may be associated to a plurality of replaceable modules. For example, if the curated time-series represents an alarm emitted by a cable connecting two physical modules, the curated time-series will be mapped to both physical modules.

The data-mapping unit 134 outputs time-series associated with identifiers of the replaceable modules. The data grouping unit 135 then creates the unlabeled data bundles 22. Each of the unlabeled data bundles 22 comprises all the time-series associated with a given replaceable module and a given time-period.

Figure 5:
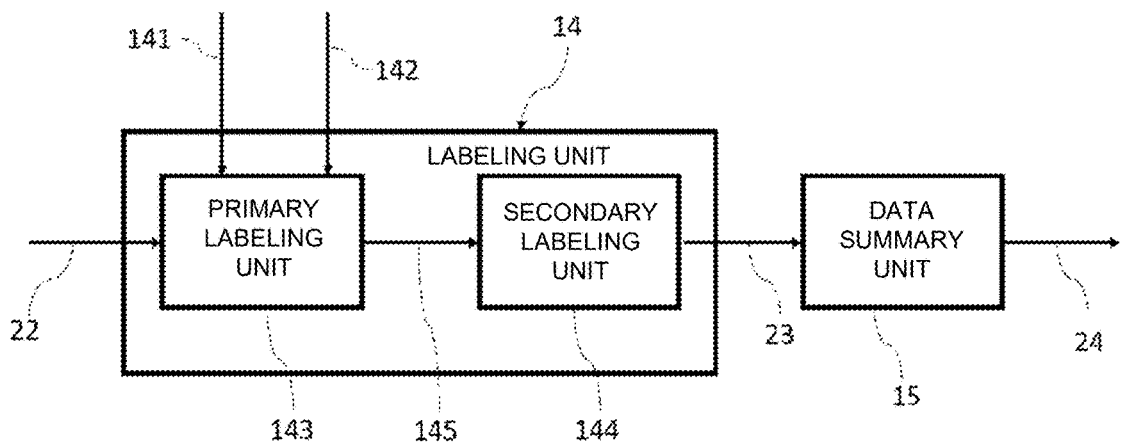
FIG. 5 represents a schematic view of a data-labelling unit and a data-summarization unit within the predictive-maintenance apparatus.

With reference to FIG. 5, the auto-labelling unit 14 and the data summarization unit 15 are described in further details.

The auto-labelling unit 14 receives the unlabeled data bundles 22 and outputs the labeled data bundles 23. The auto-labelling comprises a primary labelling unit 143 and a secondary labelling unit 144. The primary labelling unit also receives or fetches maintenance data from at least one maintenance data source.

The auto-labelling unit 14 relies on maintenance data to associate the anomaly labels to each of the unlabeled data bundles 22. According to an embodiment, the maintenance data source comprises records of on-field replacement records 141 and Repair Center data 142.

The on field-replacements records 141 comprise a list of modules which have been replaced along with a date of the replacement. However, the on-field replacements records 141 do not necessarily include a cause of the replacement. Indeed, replacements of modules may be carried out due to module failure, but also due to module upgrade.

Thus, the on-field replacements records are cross-referenced with Repair Center data 142. The Repair Center data 142 comprises references of replaced modules which have been sent to a repair center. The modules referenced in the Repair Center data 142 are confirmed to be failing and a technical diagnosis is included in the Repair Center data 142.

However, items can appear in this dataset with a random delay after their replacement. Moreover, a date of the replacement may not necessarily appear in the Repair Center data 142.

According to an embodiment, the on-field replacement records 141 are obtained by comparing consecutive daily configuration snapshot files of the network elements and detecting changes in the daily configuration snapshot files.

The auto-labelling unit 14 may then determine, using the on-field replacements records 141 and the Repair Center data 142, exactly which modules were replaced due to failures and when the failure happened.

The primary labelling unit 143 associates an anomaly label with an unlabeled data bundle 22. The primary labelling unit 143 checks whether the replaceable module to which the unlabeled data bundle relates has been replaced due to a failure in a certain time window after the ending time of the time series included in the unlabeled data.

If this is the case, the data bundle is associated with a positive anomaly label. Else, the data bundle is associated with a negative anomaly label.

According to an embodiment, the anomaly label may take more than two values and may encode a type of fault according to the diagnosis established in the Repair Center data 142. In this case, the prediction model may be a multi-class classification model.

The secondary labelling unit 144 creates a set of data bundles for each labeled data bundle with a positive anomaly label.

Each data bundle in the set of data bundles comprises the same time series as in the labeled data bundles, but over a different time period. The set of data bundles comprises K data bundles, wherein K is a hyperparameter which may be determined empirically or using unsupervised learning. The time series in the set of data bundles may be permanently stored and accessible from a data storage infrastructure.

According to an embodiment, the K data bundles in a set of data bundles cover K distinct consecutive time periods of same duration, said consecutive time periods preceding the date of the module replacement. The duration is a hyperparameter and may be externally provided. According to an embodiment, each of the K data bundles comprises time series with a maximum duration of one day.

In case of a negative anomaly label, no set of data bundles is built and the auto-labelling unit 14 only outputs the labelled data bundle 23. In case of a negative anomaly label, the labelled data bundle 23 has nonetheless the same overall duration as in the case of a positive anomaly label. The labelled data bundle 23 covers the K distinct consecutive time periods of same duration preceding the date of the module replacement.

The labelled data bundles 23 (or labelled sets of data bundles) are then transmitted to the data summarization unit 15. The data summarization unit removes network element identifiers and replaceable module identifiers from the labelled data bundles 23 and replaces them with network element metadata and replaceable module metadata. The network element metadata and replaceable module metadata encode physical and/or technical features of the network element and the replaceable module in order to ensure a better performance of the training model 17. The data summarization unit 15 outputs the summarized data bundles 24.

Figure 6:
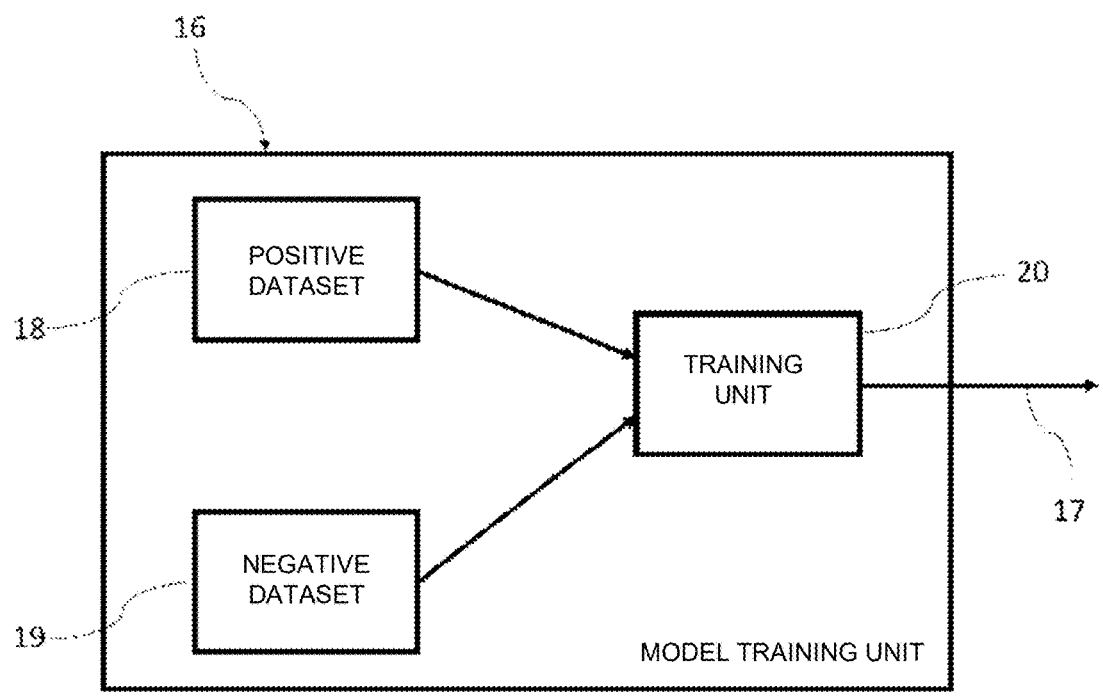
FIG. 6 represents a schematic view of a model-training unit within the predictive-maintenance apparatus.

With reference to FIG. 6, the model-training unit 16 is described. The model-training unit comprises a positive dataset 18 comprising a plurality of sets of labeled data bundles associated with a positive anomaly label and a negative dataset 19 comprising labeled data bundles associated with a negative anomaly label.

The positive dataset 18 and negative dataset 19 may also be joined into a common dataset. According to an embodiment, examples for training are sampled at random from the common dataset and fed into an elementary training unit 20 which performs the training of the prediction model 17. Alternatively, the examples for training are sampled in a way that ensures a desired proportion of elements from the positive dataset 18. Indeed, the positive dataset 18 and the negative dataset 19 may be very imbalanced and different in sizes, as there may be more negative data bundles than positive data bundles.

The model-training unit 16 may be used at the same time as the other units in the predictive-maintenance apparatus 10, or after all the data bundles have been collected or formatted. The examples for training may be processed in batches or one at a time.

According to an embodiment, the model-training unit trains a set of models in parallel and each of the set of models learns to compute the anomaly-related prediction on a different time horizon. The different time horizons may be hyperparameters of the model-training unit 16 and may be of the order of a few days or a few weeks.

The model-training unit 16 may be used for initial training, but also for fine-tuning later on. Fine-tuning may happen after a certain duration or once a performance of the predictive-maintenance apparatus is no longer deemed satisfactory. During fine-tuning, new data may be collected and used.

Figure 7:
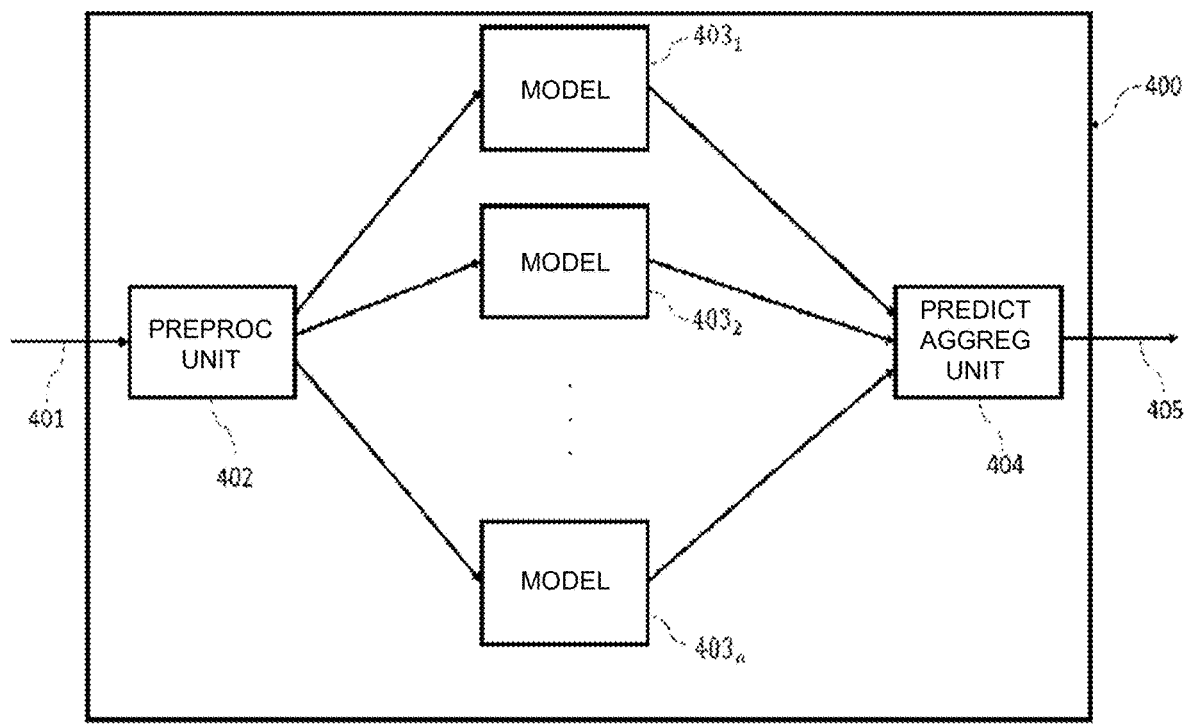
FIG. 7 represents a schematic view of an inference unit within the predictive-maintenance apparatus.

With reference to FIG. 7, the predictive-maintenance apparatus 10 may comprise an inference unit 400. The inference unit 400 receives new input data 401 and outputs a final prediction 405.

The inference unit 400 comprises a preprocessing unit 402, a set of models $403_1, 403_2, \ldots, 403_n$ and a prediction aggregation unit 404.

The set of models $403_1, 403_2, \ldots, 403_n$, once trained, may be executed in parallel. The set of models $403_1, 403_2, \ldots, 403_n$ may compute independent predictions.

The prediction aggregation unit 404 aggregates the predictions from the set of models $403_1, 403_2, \ldots, 403_n$ into the final prediction 405 over a unified time horizon and outputs the final prediction 405. If a replaceable module is predicted to fail according to different models relating to different time horizons, the final prediction 405 may contain a union of the predicted time horizons for which a fault is predicted.

Figure 8:
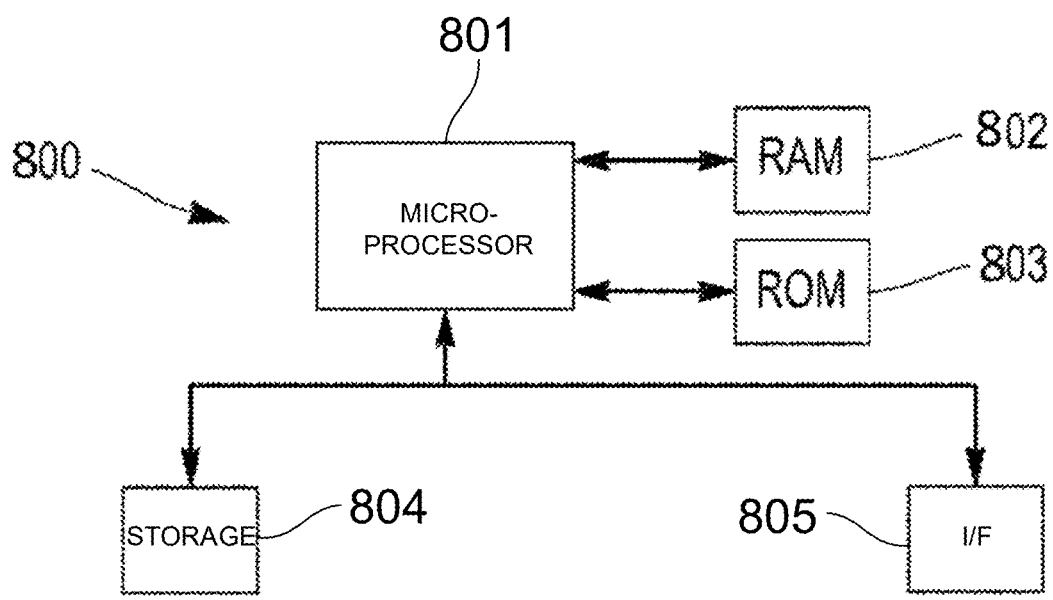
FIG. 8 is a functional diagram of a programmed computer in which example embodiments of the invention may be implemented.

FIG. 8 shows a functional diagram of a programmed computer, server, circuitry, or apparatus 800 that may be used for implementing the above-described anomaly detection apparatus. Computer 800 has a core and several peripherals connected via a communication bus. The major components of the core are a microprocessor 801 (often called the CPU) random access memory (RAM) 802 and read only memory (ROM) 803. The peripherals comprise devices that allow information to be input to the system from users, output to users and stored and retrieved (mass storage devices 804 such as hard disks and network interfaces 805).

The invention is not limited to the described example embodiments. The appended claims are to be construed as embodying all modifications and alternative constructions that may occur to one skilled in the art, and which fairly fall within the basic teaching as set forth herein.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit (s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Elements such as the apparatus and its components could be or include e.g. hardware means like e.g. an Application-Specific Integrated Circuit (ASIC), or a combination of hardware and software means, e.g. an ASIC and a Field-Programmable Gate Array (FPGA), or at least one microprocessor and at least one memory with software modules located therein, e.g. a programmed computer.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The example embodiments may be implemented by means of hardware as well as software. The same item of hardware may represent several "means".

In the claims, any reference signs placed between parentheses shall not be construed as limiting the scope of the claims.

The invention claimed is:

1. An apparatus for predictive maintenance of modules in a telecommunications network, the apparatus comprising:
at least one processor; and
at least one memory including computer program code, the at least one memory and computer program code configured to, with the at least one processor, cause the apparatus at least to perform:
collecting a primary data bundle, wherein the primary data bundle comprises a first set of measurement time-series generated by the telecommunications network during a first time-window, wherein the measurement time-series of the first set is generated by a plurality of network elements of the telecommunication network and relate to a same physical module comprising one or more hardware components in the network elements that are subject to maintenance operations,
processing maintenance data relating to maintenance of the physical module or to maintenance of a network element comprising the physical module, to determine whether the primary data bundle is associated with a fault-related maintenance intervention on the physical module carried out after the first time-window, wherein the maintenance data comprises records of on-field replacement of the physical module in the telecommunications network,
in response to determining that the primary data bundle is associated with a maintenance intervention on the physical module, creating secondary data bundles comprising a second set of measurement time-series generated by the telecommunications network during a second time-window started before the first time-window, wherein the measurement time-series of the second set relate to the physical module of the telecommunications network, wherein the secondary data bundles cover distinct consecutive time periods of a same duration, and
training a predictive model using the primary data bundle and the secondary data bundles, wherein the predictive model is configured to compute an anomaly-related prediction relating to the telecommunications network.

2. The apparatus according to claim 1, wherein:
the primary data bundle comprises identifiers identifying the network elements and identifying the physical module, and
the at least one memory and computer program code are further configured to, with the at least one processor, cause the apparatus at least to perform:
generating a summarized primary data bundle from the primary data bundle where the identifiers are removed from the primary data bundle, wherein the predictive model is trained using the summarized primary data bundle.

3. The apparatus according to claim 2, wherein the at least one memory and computer program code are further configured to, with the at least one processor, cause the apparatus at least to perform:
collecting network element metadata relating to the first network elements and module metadata relating to the physical module, and replacing the identifiers removed from the primary data bundle with the network element metadata and the module metadata.

4. The apparatus according to claim 1, wherein the first set of measurement time-series comprises alarm signals generated by the network elements.

5. The apparatus according to claim 1, wherein the processing of the maintenance data comprises determining whether the primary data bundle is associated with an on-field replacement of the physical module, and wherein the creating of the secondary data bundles is done in response to determining that the primary data bundle is associated with an on-field replacement of the physical module.

6. The apparatus according to claim 1, wherein the maintenance data further comprises records of anomalies of the physical module, wherein the processing of the maintenance data comprises determining whether the primary data bundle is associated with an anomaly of the physical module and the creating of the secondary data bundles is done in response to determining that the primary data bundle is associated with an anomaly of the physical module.

7. The apparatus according to claim 1, wherein the at least one memory and computer program code are further configured to, with the at least one processor, cause the apparatus at least to perform:
training a plurality of predictive models using the primary data bundle and the secondary data bundles, wherein each of the plurality of predictive models is configured to compute an intermediate anomaly-related prediction, wherein the anomaly-related prediction relates to a probability of anomalous behavior during different time periods, and
combining the intermediate anomaly-related predictions into a final anomaly-related prediction, wherein the final anomaly-related prediction relates to a probability of anomalous behavior during a final time period, wherein the final time period is a union of the different time periods.

8. The apparatus according to claim 1, wherein the at least one memory and computer program code are further configured to, with the at least one processor, cause the apparatus at least to perform:
retrieving a measurement time-series generated by a network element, wherein the measurement time-series represents an alarm on the telecommunications network,
determining that the physical module belongs to the network element using topology data, wherein the topology data encodes a configuration of the telecommunications network, and
adding the measurement time-series to the primary data bundle in response to determining that the physical module belongs to the network element.

9. The apparatus according to claim 1, wherein the at least one memory and computer program code are further configured to, with the at least one processor, cause the apparatus at least to perform:
retrieving a measurement time-series generated by a network element, wherein the measurement time-series represents an alarm on the telecommunications network,
comparing an identifier of the network element with an identifier of the physical module to determine that the identifier of the network element and the identifier of the physical module fulfil a similarity condition using a semantic similarity metric, and
adding the measurement time-series to the primary data bundle in response to determining that the identifier of the network element and the identifier of the physical module fulfil the similarity condition.

10. The apparatus according to claim 1, wherein:
the physical module comprises a replaceable module connected to a network element.

11. A method for predictive maintenance of modules in a telecommunications network, the method comprising the steps of:
collecting a primary data bundle, wherein the primary data bundle comprises a first set of measurement time-series generated by the telecommunications network during a first time-window, wherein the measurement time-series of the first set is generated by a plurality of network elements of the telecommunication network and relate to a same physical module comprising one or more hardware components in the network elements that are subject to maintenance operations,
processing maintenance data relating to maintenance of the physical module or to maintenance of a network element comprising the physical module, to determine whether the primary data bundle is associated with a fault-related maintenance intervention on the physical module carried out after the first time-window, wherein the maintenance data comprises records of on-field replacement of the physical module in the telecommunications network,
in response to determining that the primary data bundle is associated with a maintenance intervention on the physical module, creating secondary data bundles comprising a second set of measurement time-series generated by the telecommunications network during a second time-window started before the first time-window, wherein the measurement time-series of the second set relate to the physical module of the telecommunications network, wherein the secondary data bundles cover distinct consecutive time periods of a same duration, and
training a predictive model using the primary data bundle and the secondary data bundles, wherein the predictive model is configured to compute an anomaly-related prediction relating to the telecommunications network.

12. The method according to claim 11, wherein the primary data bundle comprises identifiers identifying the network elements and identifying the physical module, the method further comprising the steps of generating a summarized primary data bundle from the primary data bundle where the identifiers are removed from the primary data bundle, wherein the predictive model is trained using the summarized primary data bundle.

13. The method according to claim 12, the method further comprising the steps of collecting network element metadata relating to the network elements and module metadata relating to the physical module, and replacing the identifiers removed from the primary data bundle with the network element metadata and the module metadata.

14. The method according to claim 11, wherein the first set of measurement time-series comprises alarm signals generated by the network elements.

15. The method according to claim 11, wherein the processing of the maintenance data comprises determining whether the primary data bundle is associated with an on-field replacement of the physical module, and wherein the creating of the secondary data bundles is done in response to determining that the primary data bundle is associated with an on-field replacement of the physical module.

16. The method according to claim 11, wherein the maintenance data further comprises records of anomalies of the physical module, wherein the processing of the maintenance data comprises determining whether the primary data bundle is associated with an anomaly of the physical module and the creating of the secondary data bundles is done in response to determining that the primary data bundle is associated with an anomaly of the physical module.

17. The method according to claim 11, further comprising the steps of:
training a plurality of predictive models using the primary data bundle and the secondary data bundles, wherein each of the plurality of predictive models is configured to compute an intermediate anomaly-related prediction, wherein the anomaly-related prediction relates to a probability of anomalous behavior during different time periods, and
combining the intermediate anomaly-related predictions into a final anomaly-related prediction, wherein the final anomaly-related prediction relates to a probability of anomalous behavior during a final time period, wherein the final time period is a union of the different time periods.

18. The method according to claim 11, further comprising the steps of:
retrieving a measurement time-series generated by a network element, wherein the measurement time-series represents an alarm on the telecommunications network,
determining that the physical module belongs to the network element using topology data, wherein the topology data encodes a configuration of the telecommunications network, and
adding the measurement time-series to the primary data bundle in response to determining that the physical module belongs to the network element.

19. The method according to claim 11, further comprising the steps of:
retrieving a measurement time-series generated by a network element, wherein the measurement time-series represents an alarm on the telecommunications network,
comparing an identifier of the network element with an identifier of the physical module to determine that the identifier of the network element and the identifier of the physical module fulfil a similarity condition using a semantic similarity metric, and
adding the measurement time-series to the primary data bundle in response to determining that the identifier of the network element and the identifier of the physical module fulfil the similarity condition.

20. The method according to claim 11, wherein:
the physical module comprises a replaceable module connected to a network element.

* * * * *